United States Patent
Gao et al.

(10) Patent No.: US 10,666,614 B2
(45) Date of Patent: May 26, 2020

(54) MULTICAST SECURITY CONTROL METHOD AND DEVICE BASED ON DNS

(71) Applicant: ZTE CORPORATION, Guangdong (CN)

(72) Inventors: Chunsheng Gao, Guangdong (CN); Yunfei Wu, Guangdong (CN); Yu Wei, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 341 days.

(21) Appl. No.: 15/512,456

(22) PCT Filed: Jun. 8, 2015

(86) PCT No.: PCT/CN2015/081008
§ 371 (c)(1),
(2) Date: Mar. 17, 2017

(87) PCT Pub. No.: WO2016/041388
PCT Pub. Date: Mar. 24, 2016

(65) Prior Publication Data
US 2017/0295139 A1    Oct. 12, 2017

(30) Foreign Application Priority Data
Sep. 19, 2014    (CN) .......................... 2014 1 0484467

(51) Int. Cl.
*G06F 15/173*    (2006.01)
*H04L 29/06*    (2006.01)
(Continued)

(52) U.S. Cl.
CPC ........ *H04L 63/0236* (2013.01); *H04L 9/3271* (2013.01); *H04L 63/104* (2013.01);
(Continued)

(58) Field of Classification Search
CPC .............. H04N 21/6405; H04L 9/3271; H04L 61/1511; H04L 63/104; H04L 63/04; H04L 63/101; H04L 63/0236
(Continued)

(56) References Cited

U.S. PATENT DOCUMENTS

2008/0301744 A1* 12/2008 Hutchings ......... H04L 29/12066
725/110
2008/0307479 A1* 12/2008 Jones ................. H04N 7/17354
725/115
(Continued)

FOREIGN PATENT DOCUMENTS

CN            1672359 A         9/2005
CN          101330466 A        12/2008
(Continued)

OTHER PUBLICATIONS

International Search Report for Application No. PCT/CN2015/081008, dated Sep. 14, 2015.
(Continued)

*Primary Examiner* — Frantz B Jean
(74) *Attorney, Agent, or Firm* — Marshall, Gerstein & Borun LLP

(57) ABSTRACT

The present disclosure relates to a multicast security control method and device based on DNS. The method includes: transmitting a DNS request message to a domain name server to acquire a multicast source DNS address list of an IPTV server; conducting address verification on a multicast data message according to the multicast source DNS address list and a locally maintained multicast address list after the multicast data message issued by the IPTV server is received; and conducting forwarding control on the multicast data message according to a verification result.

16 Claims, 4 Drawing Sheets

(51) Int. Cl.
*H04N 21/6405* (2011.01)
*H04L 9/32* (2006.01)
*H04L 29/12* (2006.01)

(52) U.S. Cl.
CPC ...... *H04N 21/6405* (2013.01); *H04L 61/1511* (2013.01); *H04L 63/04* (2013.01); *H04L 63/101* (2013.01)

(58) Field of Classification Search
USPC .......................................................... 709/225
See application file for complete search history.

(56) References Cited

U.S. PATENT DOCUMENTS

| | | | | |
|---|---|---|---|---|
| 2009/0100147 | A1* | 4/2009 | Igarashi | H04N 7/17309 709/218 |
| 2010/0020796 | A1 | 1/2010 | Park et al. | |
| 2010/0195651 | A1* | 8/2010 | Dayong | H04L 12/1886 370/390 |
| 2011/0103374 | A1* | 5/2011 | Lajoie | H04L 65/1016 370/352 |
| 2011/0176545 | A1* | 7/2011 | Boers | H04L 12/185 370/390 |
| 2013/0227284 | A1* | 8/2013 | Pfeffer | H04L 63/0236 713/168 |

FOREIGN PATENT DOCUMENTS

| | | |
|---|---|---|
| CN | 101478477 A | 7/2009 |
| CN | 101719919 A | 6/2010 |
| CN | 101827037 A | 9/2010 |
| WO | WO-2009/106126 A1 | 9/2009 |

OTHER PUBLICATIONS

Supplementary European Search Report issued in European Patent Application No. 15 84 1904.4 dated Mar. 28, 2018.
Office Action issued in Chinese Patent Application No. 201410484467.8 dated Sep. 4, 2019.

* cited by examiner

MULTICAST SECURITY CONTROL METHOD AND DEVICE BASED ON DNS

TECHNICAL FIELD

The present disclosure relates to the field of communication technologies, and in particular relates to a multicast security control method and device based on Domain Name System (DNS).

BACKGROUND

Multicast is served as a core of IPTV services, so the security of multicast is an important issue. From the perspective of the realization of existing broadband access devices, there is no good solution, wherein a key problem is the authentication of a multicast source. The existing technical protocol, such as a source filtering function of the IGMPV3 protocol, is not realized or supported at a user terminal device (such as STB) or a local device due to the complexity in realization, thereby allowing any multicast server to transmit a multicast stream to a terminal device, and resulting in a security potential hazard. Therefore, the existing art cannot control or cannot dynamically control the multicast source.

SUMMARY

A main objective of the present disclosure is to provide a multicast security control method and device based on DNS, which aims at solving the problem that the existing multicast realization technology cannot control or cannot dynamically control a multicast source.

To achieve the aforementioned objective, embodiments of the present disclosure provide a multicast security control method based on DNS, including: transmitting a DNS request message to a domain name server to acquire a multicast source DNS address list of an IPTV server; conducting address verification on a multicast data message according to the multicast source DNS address list and a locally maintained multicast address list after the multicast data message issued by the IPTV server is received; and conducting forwarding control on the multicast data message according to a verification result.

In embodiments of the present disclosure, the step of transmitting the DNS request message to the domain name server to acquire the multicast source DNS address list information of the IPTV server includes: allocating domain name address information of the IPTV server; transmitting the DNS request message to the domain name server, where the DNS request message includes the domain name address information of the IPTV server; receiving a response message, fed back by the domain name server, corresponding to the domain name address information of the IPTV server; and parsing the response message to acquire the multicast source DNS address list of the IPTV server.

In embodiments of the present disclosure, the step of conducting address verification on the multicast data message according to the multicast source DNS address list and a locally maintained multicast address list after the multicast data message issued by the IPTV server is received includes: parsing the multicast data message to acquire a source IP address and a destination IP address of the multicast data message after the multicast data message issued by the IPTV server is received; matching the source IP address of the multicast data message with the multicast source DNS address list, and matching the destination IP address of the multicast data message with the multicast address list; succeeding in verification when both the source IP address and the destination IP address of the multicast data message are matched with corresponding address information; otherwise, failing in verification.

In embodiments of the present disclosure, the step of conducting forwarding control on the multicast data message according to the verification result includes: forwarding the multicast data message to an IPTV receiving device when the verification succeeds; otherwise, abandoning the multicast data message.

In embodiments of the present disclosure, prior to the step of conducting address verification on the multicast data message according to the multicast source DNS address list information and the locally maintained multicast address list, the method further includes: receiving a multicast protocol message transmitted by the IPTV receiving device, and forwarding the multicast protocol message to the IPTV server; parsing the multicast protocol message, and judging whether the multicast protocol message is a joining message or a leaving message; and, adding the corresponding multicast address information into the multicast address list if the multicast protocol message is the joining message; and deleting the corresponding multicast address information from the multicast address list if the multicast protocol message is the leaving message.

In embodiments of the present disclosure, the multicast source DNS address list information includes an address updating time issued by the domain name server; and, after the step of acquiring the multicast source DNS address list of the IPTV server, the method further includes: setting a timer according to the address updating time, and regularly transmitting a DNS request message to the domain name server to update the multicast source DNS address list of the IPTV server.

Embodiments of the present disclosure further propose a multicast security control device based on DNS, including: an acquisition module, configured to transmit a DNS request message to a domain name server to acquire a multicast source DNS address list of an IPTV server; a verification module, configured to conduct address verification on a multicast data message according to the multicast source DNS address list and a locally maintained multicast address list after the multicast data message issued by the IPTV server is received; and a control module, configured to conduct forwarding control on the multicast data message according to a verification result.

In embodiments of the present disclosure, the acquisition module includes: a configuration unit, configured to allocate domain name address information of the IPTV server; a transmission unit, configured to transmit the DNS request message to the domain name server, where the DNS request message includes the domain name address information of the IPTV server; a receiving unit, configured to receive a response message, fed back by the domain name server, corresponding to the domain name address information of the IPTV server; and an acquisition unit, configured to parse the response message to acquire the multicast source DNS address list of the IPTV server.

In embodiments of the present disclosure, the verification module includes: a parsing unit, configured to parse the multicast data message to acquire a source IP address and a destination IP address of the multicast data message after the multicast data message issued by the IPTV server is received; a matching unit, configured to match the source IP address of the multicast data message with the multicast source DNS address list, and to match the destination IP address of the multicast data message with the multicast address list; and a judging unit, configured to determine success in verification when both the source IP address and the destination IP address of the multicast data message are matched with the corresponding address information, otherwise to determine failure in verification.

In embodiments of the present disclosure, the control module is further configured to forward the multicast data message to an IPTV receiving device when the verification succeeds, otherwise, to abandon the multicast data message.

In embodiments of the present disclosure, the device further includes: a multicast address updating module, configured to receive a multicast protocol message transmitted by the IPTV receiving device, and to forward the multicast protocol message to the IPTV server; to parse the multicast protocol message, and to judge whether the multicast protocol message is a joining message or a leaving message; and, to add the corresponding multicast address information into the multicast address list if the multicast protocol message is the joining message; and to delete the corresponding multicast address information from the multicast address list if the multicast protocol message is the leaving message.

In embodiments of the present disclosure, the acquisition module is further configured to set a timer according to the address updating time, and to regularly transmit the DNS request message to the domain name server to update the multicast source DNS address list of the IPTV server.

According to the multicast security control method and device based on DNS provided by embodiments of the present disclosure, the multicast source DNS address list of the IPTV server is acquired by transmitting the DNS request message to the domain name server; address verification on the multicast data message is according to the multicast source DNS address list and a locally maintained multicast address list after the multicast data message issued by the IPTV server is received; and forwarding control on the multicast data message is conducted according to the verification result, the message is forwarded if the verification meets the requirement, and the message is abandoned if the verification does not meet the requirement. Accordingly, the authentication of the multicast source can be effectively carried out through the method of filtering the message via the multicast source DNS list, thereby realizing the effective security control over the multicast service flow, not only ensuring the stability of the multicast service and reducing network attacks, but also simplifying a complex processing flow of the multicast source filtering, and being simple in the engineering realization and deployment.

In order to make a technical solution of embodiments of the present disclosure clearer and more comprehensible, the present disclosure is further described below in detail in combination with the drawings.

DETAILED DESCRIPTION

It should be understood that concrete embodiments described herein are only used for explaining the present disclosure rather than limiting the present disclosure.

A main solution of embodiments of the present disclosure is as follows: a domain name service (DNS) request message is transmitted to a domain name server to acquire a multicast source DNS address list of an IPTV server; address verification on the multicast data message is conducted according to the multicast source DNS address list and a locally maintained multicast address list after the multicast data message issued by the IPTV server is received; and forwarding control on the multicast data message is conducted according to a verification result, the message is forwarded if the verification meets the requirement, the message is abandoned if the verification does not meet the requirement. Accordingly, the multicast service flow is effectively controlled through the method of filtering the message via the multicast source DNS list, a complex processing flow of the multicast source filtering is simplified, the engineering realization and deployment are simple.

Figure 1:
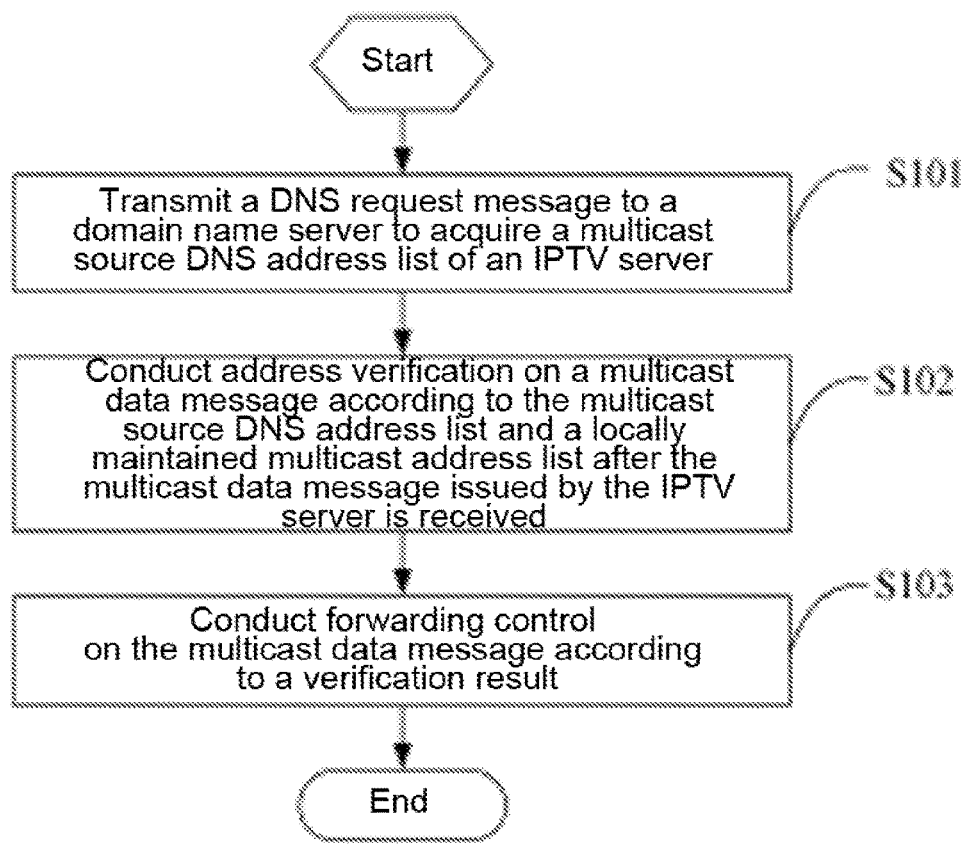
FIG. 1 is a flow chart illustrating a multicast security control method based on DNS according to an embodiment of the present disclosure.

As shown in FIG. 1, an embodiment of the present disclosure provides a multicast security control method based on DNS, including:

step S101, a DNS request message is transmitted to a domain name server to acquire a multicast source DNS address list of an IPTV server; and an operating environment of the method of the present embodiment involves the IPTV server, the domain name server and an IPTV receiving device, and the IPTV receiving device is linked to a user interface of the device for executing the method of the present embodiment, wherein the IPTV server is configured to provide a multicast service data flow to the IPTV receiving device, and the domain name server is configured to manage the multicast source DNS address.

Since the multicast realization technology in a related art cannot control or cannot dynamically control a multicast source, any IPTV server can transmit the multicast data flow (multicast data message) to a user terminal device (a set top box, etc.), resulting in a security potential hazard, but actually for a household user, the multicast server is relatively constant. In view of this, the solution adopted by the present embodiment can effectively control the multicast service flow, and can simplify the complex processing flow of the multicast source filtering.

Optionally, the device for implementing the method of the present embodiment firstly allocates a website (i.e. a domain name) of the IPTV server, and then acquires a multicast source DNS address list of the IPTV server by transmitting the DNS request message to the domain name server. The device also locally maintains a multicast source DNS list and a multicast address list, and the multicast source DNS list and the multicast address list may be maintained and managed through a set address management module, wherein the multicast source DNS address list includes IP address information corresponding to the DNS of the multicast source, and the multicast address list includes multicast address information which is used for matching the multicast source IP address information.

The process of acquiring the multicast source DNS address list of the IPTV server in the present embodiment is as follows:

Firstly, the device for implementing the method of the present embodiment configures the domain name address information of the IPTV server.

The DNS request message is transmitted to the domain name server after a multicast service is started, and the DNS request message carries the domain name address information of the IPTV server.

Then a response message, fed back by the domain name server, corresponding to the domain name address information of the IPTV server is received, the response message includes the multicast source DNS address list of the IPTV server and a TTL time, i.e. an interval transmission time for re-transmitting the DNS request message, also i.e. a multicast source DNS address updating time.

The device parses the response message fed back by the domain name server and acquires the multicast source DNS address list of the IPTV server.

Optionally, in an embodiment, the device may also set a timer according to the TTL time of the DNS request message issued by the domain name server, and regularly transmits the DNS request message to the domain name server so as to update the multicast source DNS address list of the IPTV server.

Optionally, after the timer expires, the device re-transmits the DNS request to dynamically acquire the multicast source DNS list, and configures the acquired multicast source DNS list information to an address management module, so that the multicast source DNS list is regularly updated.

In the aforementioned process, if a message of stopping the multicast service is received, the DNS request message is not transmitted.

Step S102, address verification on a multicast data message is conducted according to the multicast source DNS address list and a locally maintained multicast address list after the multicast data message issued by the IPTV server is received; and the multicast data message issued by the IPTV server may be continuously received after the device starts the multicast service, wherein the issued multicast data message may be from the IPTV server specified by a user, and may also be from other IPTV servers or networks. Therefore, the multicast data message received by the device is required to be filtered. A solution adopted by the present embodiment is as follows: the address verification of the multicast data message is conducted according to the multicast source DNS address list and the locally maintained multicast address list so as to achieve an objective of filtering the message. The process is as follows:

Firstly, the multicast data message is parsed to acquire the source IP address and the destination IP address of the multicast data message after the multicast data message issued by the IPTV server is received.

Thereafter, the source IP address of the multicast data message is matched with the multicast source DNS address list, the destination IP address of the multicast data message is matched with the multicast address list, whether there is IP address information corresponding to the source IP address of the above-mentioned multicast data message in the multicast source DNS address list is judged, and whether there is multicast address information corresponding to the destination IP address of the aforementioned multicast data message in the multicast address list is judged.

The verification succeeds when both the source IP address and the destination IP address of the multicast data message are matched with the corresponding address information; otherwise, the verification fails.

Step S103, forwarding control on the multicast data message is conducted according to a verification result.

The multicast data message is forwarded to the IPTV receiving device when the verification succeeds; otherwise, the multicast data message is abandoned.

In the present embodiment, through the aforementioned solution, the DNS request message is transmitted to the domain name server to acquire the multicast source DNS address list of the IPTV server; the address verification on the multicast data message is conducted according to the multicast source DNS address list and the locally maintained multicast address list after the multicast data message issued by the IPTV server is received; and forwarding control on the multicast data message is conducted according to the verification result, the message is forwarded if the verification meets the requirement, and the message is abandoned if the verification does not meet the requirement. Therefore, the authentication of the multicast source can be effectively carried out through the method of filtering the message via the multicast source DNS list, thereby realizing the effective security control over the multicast service flow, not only ensuring the stability of the multicast service and reducing network attacks, but also simplifying a complex processing flow of the multicast source filtering, and being simple in the engineering realization and deployment.

Figure 2:
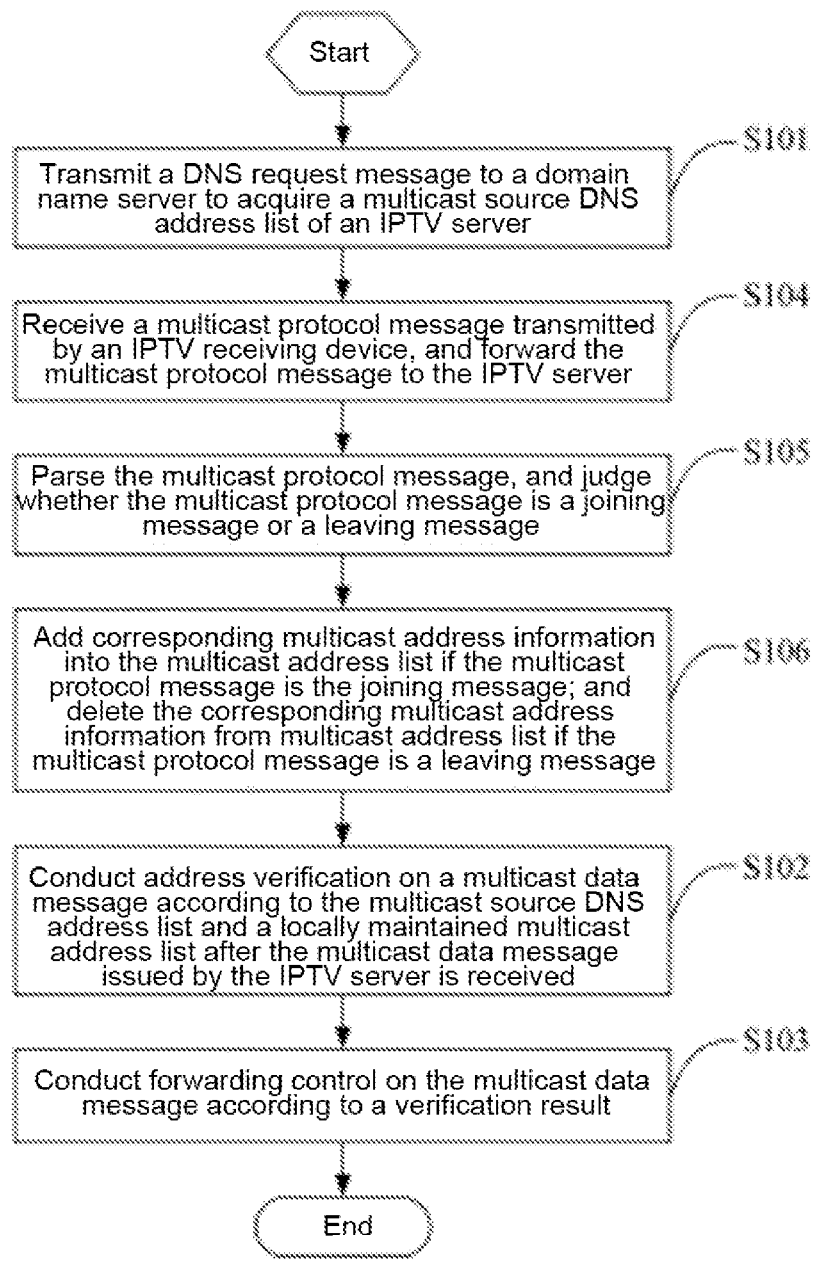
FIG. 2 is a flow chart illustrating a multicast security control method based on DNS according to another embodiment of the present disclosure.

As shown in FIG. 2, another embodiment of the present disclosure provides a multicast security control method based on DNS. On the basis of the aforementioned embodiment of FIG. 1, prior to the conducting the address verification on the multicast data message according to the multicast source DNS address list information and the locally maintained multicast address list, the method further includes:

Step S104, a multicast protocol message transmitted by the IPTV receiving device is received, and forwarded to the IPTV server;

Step S105, the multicast protocol message is parsed, and whether the multicast protocol message is a joining message or a leaving message is judged;

Step S106, the corresponding multicast address information is added into the multicast address list if the multicast protocol message is the joining message; and the corresponding multicast address information is deleted from the multicast address list if the multicast protocol message is the leaving message.

Compared with the embodiment shown in FIG. 1, the present embodiment further includes a solution of updating the multicast address list.

Optionally, the device may receive the multicast protocol message transmitted by the IPTV receiving device, the multicast protocol message is forwarded by the device to the IPTV server, so that a specified IPTV server parses the multicast protocol message (judges whether the message is the joining message or the leaving message), and transmits or stops the multicast service flow.

The device forwards the multicast protocol message to the IPTV server after receiving the multicast protocol message transmitted by the IPTV receiving device. Meanwhile, the device may also parse the multicast protocol message, and judges whether the multicast protocol message is the joining message or the leaving message.

The corresponding multicast address information is added into the multicast address list if the multicast protocol message is the joining message; and the corresponding multicast address information is deleted from the multicast address list if the multicast protocol message is the leaving message, and simultaneously the updated multicast address list is updated and configured to the address management module.

Through the aforementioned solution, the present embodiment ensures that the information in the multicast address list is continuously updated so as to improve the verification efficiency of the multicast data message.

Compared with the related art, in the solution of the present embodiment, the address of the IPTV server is firstly allocated after the device is powered on, and then the multicast source DNS list information of the IPTV server is acquired by transmitting the DNS request message. The acquired multicast source DNS list information is configured to the address management module; after the user interface receives the multicast protocol message, the address information is added and configured to the address management module; and the multicast protocol message is forwarded to an upper layer IPTV receiving device. When the device receives the multicast data flow, whether the source IP address and the destination IP address of the message are eligible or not can be checked, if the source IP address and the destination IP address of the message are eligible, the message is forwarded according to a learned group address, otherwise, the message is abandoned. By realizing embodiments of the present disclosure, the complex processing flow of the multicast source filtering is simplified, an upper layer device or a lower layer device of the device is not required to support the source filtering, the engineering realization and deployment are simple, and certain instructive and popularization value for improving the multicast security technology is achieved.

It should be noted that embodiments of the present disclosure are not limited to the aforementioned embodiments; various other embodiments may also be provided; for example, the method can be used for controlling both an IPV4 protocol or an IPV6 multicast application scenario.

Figure 3:
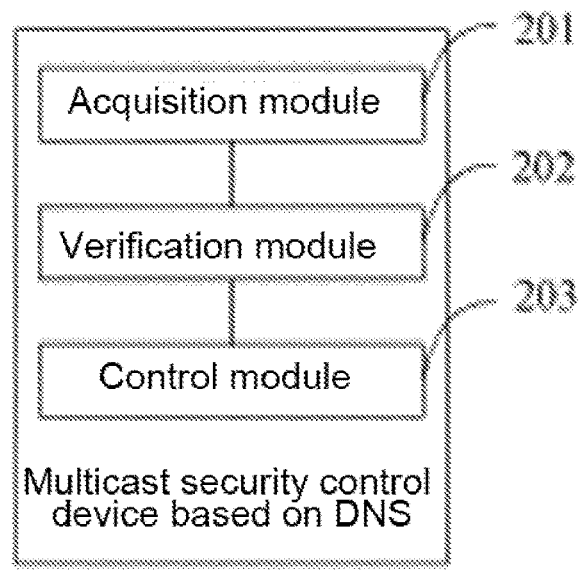
FIG. 3 is a schematic diagram illustrating functional modules of a multicast security control device based on DNS according to an embodiment of the present disclosure.

As shown in FIG. 3, an embodiment of the present disclosure proposes a multicast security control device based on DNS, which includes: an acquisition module 201, a verification module 202 and a control module 203, wherein the acquisition module 201 is configured to transmit a DNS request message to a domain name server to acquire a multicast source DNS address list of an IPTV server;

the verification module 202 is configured to conduct address verification on a multicast data message according to the multicast source DNS address list and the locally maintained multicast address list after the multicast data message issued by the IPTV server is received; and the control module 203 is configured to conduct forwarding control on the multicast data message according to a verification result.

Specifically, an operating environment of the present embodiment involves the IPTV server, the domain name server and an IPTV receiving device, and the IPTV receiving device is linked to a user interface of the device for executing the method of the present embodiment, wherein the IPTV server is configured to provide a multicast service data flow to the IPTV receiving device, and the domain name server is configured to manage the multicast source DNS address.

Since the existing multicast realization technology cannot control or cannot dynamically control a multicast source, any IPTV server can transmit the multicast data flow (multicast data message) to a user terminal device (a set top box, etc.), resulting in a security potential hazard, but actually for a household user, the multicast server is relatively constant. In view of this, the solution adopted by the present embodiment can effectively control the multicast service flow, and can simplify the complex processing flow of the multicast source filtering.

Optionally, the device for implementing the method of the present embodiment firstly allocates a website (i.e. a domain name) of the IPTV server, and then acquires multicast source DNS list information of the IPTV server by transmitting the DNS request message to the domain name server. The device also locally maintains a multicast source DNS list and a multicast address list, and the multicast source DNS list and the multicast address list may be maintained and managed through a set address management module. The multicast source DNS address list includes IP address information corresponding to the DNS of the multicast source, and the multicast address list includes multicast address information which is used for matching the multicast source IP address information.

The process of acquiring the multicast source DNS address list of the IPTV server in the present embodiment is specifically as follows:

Firstly, the device for implementing the method of the present embodiment configures the domain name address information of the IPTV server.

The DNS request message is transmitted to the domain name server after a multicast service is started, and the DNS request message carries the domain name address information of the IPTV server.

Then a response message, fed back by the domain name server, corresponding to the domain name address information of the IPTV server is received, the response message includes a multicast source DNS address list of the IPTV server and a TTL time, i.e. an interval transmission time for re-transmitting the DNS request message, also i.e. a multicast source DNS address updating time.

The device parses the response message fed back by the domain name server and acquires the multicast source DNS address list of the IPTV server.

Optionally, in an embodiment, the device may also set a timer according to the TTL time of the DNS request message issued by the domain name server, and regularly transmits the DNS request message to the domain name server so as to update the multicast source DNS address list of the IPTV server.

Optionally, after the timer expires, the device re-transmits the DNS request to dynamically acquire the multicast source DNS list, and configures the acquired multicast source DNS list information to an address management module, so that the multicast source DNS list is regularly updated.

In the aforementioned process, if a message of stopping the multicast service is received, the DNS request message is not transmitted.

The multicast data message issued by the IPTV server may be continuously received after the device starts the multicast service, wherein the issued multicast data message may be from the IPTV server specified by a user, and may also be from other IPTV servers or networks. Therefore, the multicast data message received by the device is required to be filtered. A solution adopted by the present embodiment is as follows: address verification on the multicast data message is conducted according to the multicast source DNS address list and the locally maintained multicast address list so as to achieve an objective of filtering the message. The specific process is as follows:

Firstly, the multicast data message is parsed to acquire a source IP address and a destination IP address of the multicast data message after the multicast data message issued by the IPTV server is received.

Then, the source IP address of the multicast data message is matched with the multicast source DNS address list, the destination IP address of the multicast data message is matched with the multicast address list, whether there is IP address information corresponding to the source IP address of the above-mentioned multicast data message in the multicast source DNS address list is judged, and whether there is multicast address information corresponding to the destination IP address of the aforementioned multicast data message in the multicast address list is judged. The verification succeeds when both the source IP address and the destination IP address of the multicast data message are matched with the corresponding address information; otherwise, the verification fails.

The multicast data message is forwarded to the IPTV receiving device when the verification succeeds; otherwise, the multicast data message is abandoned.

In the present embodiment, through the aforementioned solution, the DNS request message is transmitted to the domain name server to acquire the multicast source DNS address list of the IPTV server; the address verification on the multicast data message is conducted according to the multicast source DNS address list and the locally maintained multicast address list after the multicast data message issued by the IPTV server is received; and forwarding control on the multicast data message is conducted according to the verification result, the message is forwarded if the verification meets the requirement, and the message is abandoned if the address does not meet the requirement. Therefore, the authentication of the multicast source can be effectively carried out through the method of filtering the message via the multicast source DNS list, thereby realizing the effective security control over the multicast service flow, not only ensuring the stability of the multicast service and reducing network attacks, but also simplifying a complex processing flow of the multicast source filtering, and being simple in the engineering realization and deployment.

Figure 4:
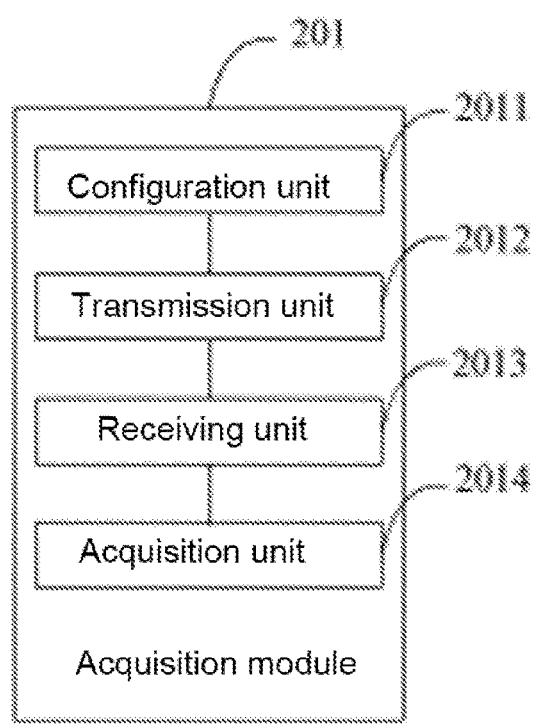
FIG. 4 is a schematic structural diagram illustrating an acquisition module according to embodiments of the present disclosure.

Optionally, in an embodiment, as shown in FIG. 4, the acquisition module 201 includes a configuration unit 2011, a transmission unit 2012, a receiving unit 2013 and an acquisition unit 2014, wherein the configuration unit 2011 is configured to allocate domain name address information of the IPTV server;

the transmission unit 2012 is configured to transmit the DNS request message to the domain name server, and the DNS request message carries the domain name address information of the IPTV server;

the receiving unit 2013 is configured to receive a response message, fed back by the domain name server, corresponding to the domain name address information of the IPTV server; and the acquisition unit 2014 is configured to parse the response message to acquire the multicast source DNS address list of the IPTV server.

Figure 5:
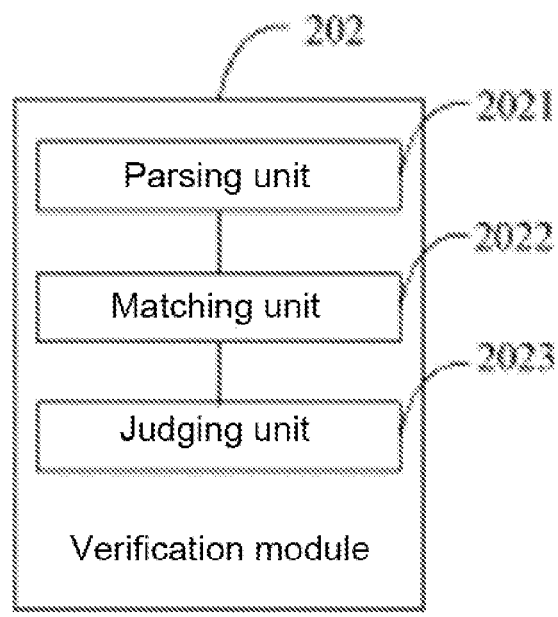
FIG. 5 is a schematic structural diagram illustrating a verification module according to embodiments of the present disclosure.

As shown in FIG. 5, the verification module 202 includes a parsing unit 2021, a matching unit 2022 and a judging unit 2023, wherein the parsing unit 2021 is configured to parse the multicast data message to acquire a source IP address and a destination IP address of the multicast data message after the multicast data message issued by the IPTV server is received;

the matching unit 2022 is configured to match the source IP address of the multicast data message with the multicast source DNS address list, and to match the destination IP address of the multicast data message with the multicast address list; and the judging unit 2023 is configured to determine the success in verification when both the source IP address and the destination IP address of the multicast data message are matched with the corresponding address information, otherwise to judge the failure in verification.

Figure 6:
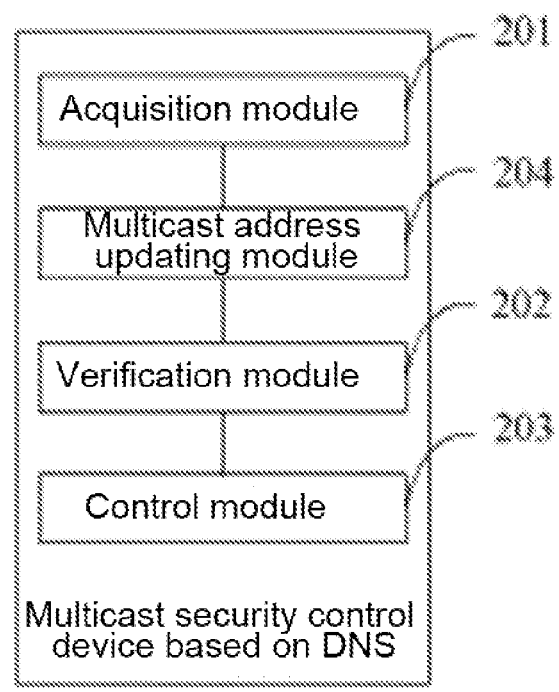
FIG. 6 is a schematic diagram illustrating functional modules of the multicast security control device based on DNS according to another embodiment of the present disclosure.

As shown in FIG. 6, another embodiment of the present disclosure provides a multicast security control device based on DNS. On the basis of the embodiment shown in FIG. 3, further including:

a multicast address updating module 204 which is configured to receive the multicast protocol message transmitted by the IPTV receiving device and forward same to the IPTV server; to parse the multicast protocol message, and to judge whether the multicast protocol message is a joining message or a leaving message; to add the corresponding multicast address information into the multicast address list if the multicast protocol message is the joining message; and to delete the corresponding multicast address information from the multicast address list if the multicast protocol message is the leaving message.

Compared with the embodiment shown in FIG. 3, the present embodiment further includes a solution of updating the multicast address list.

Optionally, the device may receive the multicast protocol message transmitted by the IPTV receiving device; the multicast protocol message is forwarded by the device to the IPTV server, so that a specified IPTV server parses the multicast protocol message (judges whether the message is the joining message or the leaving message), and transmits or stops the multicast service flow.

The device forwards the multicast protocol message to the IPTV server after receiving the multicast protocol message transmitted by the IPTV receiving device. Meanwhile, the device may also parse the multicast protocol message, and judges whether the multicast protocol message is the joining message or the leaving message.

The corresponding multicast address information is added into the multicast address list if the multicast protocol message is the joining message; and the corresponding multicast address information is deleted from the multicast address list if the multicast protocol message is the leaving message, and simultaneously the updated multicast address list is updated and configured to the address management module.

Through the aforementioned solution, the present embodiment ensures that the information in the multicast address list is continuously updated so as to improve the verification efficiency of the multicast data message.

Compared with the related art, in the solution of the present embodiment, the address of the IPTV server is firstly allocated after the device is powered on, and then the multicast source DNS list information of the IPTV server is acquired by transmitting the DNS request message. The acquired multicast source DNS list information is configured to the address management module; after the user interface receives the multicast protocol message, the address information is added and configured to the address management module; and the multicast protocol message is forwarded to an upper layer IPTV receiving device. When the device receives the multicast data flow, whether the source IP address and the destination IP address of the message are eligible or not can be checked, if the source IP address and the destination IP address of the message are eligible, the message is forwarded according to a learned group address, otherwise, the message is abandoned. By realizing embodiments of the present disclosure, the complex processing flow of the multicast source filtering is simplified, an upper layer device or a lower layer device of the device is not required to support the source filtering, the engineering realization and deployment are simple, and certain instructive and popularization value for improving the multicast security technology is achieved.

It should be noted that embodiments of the present disclosure are not limited to the aforementioned embodiments; various other embodiments may also be provided; for example, the method can be used for controlling both an IPV4 protocol or an IPV6 multicast application scenario.

The above descriptions are only embodiments of the present disclosure, rather than a limit to the present disclosure. Any equivalent structure or flow transformation made to the description and accompanied drawings of the present disclosure, or direct or indirect application in other related arts shall be also included in the protection scope of the present disclosure.

INDUSTRIAL APPLICABILITY

As mentioned above, through the aforementioned embodiments and implementation ways, the method of filtering the message through the multicast source DNS list can effectively carry out the authentication of the multicast source, thereby realizing the effective security control over the multicast service flow, not only ensuring the stability of the multicast service and reducing network attacks, but also simplifying a complex processing flow of the multicast source filtering, and being simple in engineering realization and deployment.

What is claimed is:

1. A multicast security control method based on Domain Name System DNS, comprising:
    transmitting a DNS request message to a domain name server to acquire a multicast source DNS address list of an Internet Protocol Television IPTV server;
    conducting address verification on a multicast data message according to the multicast source DNS address list and a locally maintained multicast address list after the multicast data message issued by the IPTV server is received; and
    conducting forwarding control on the multicast data message according to a verification result;
    wherein the step of transmitting the DNS request message to the domain name server to acquire the multicast source DNS address list information of the IPTV server comprises:
    allocating domain name address information of the IPTV server;
    transmitting the DNS request message to the domain name server, wherein the DNS request message includes the domain name address information of the IPTV server;
    receiving a response message, fed back by the domain name server, corresponding to the domain name address information of the IPTV server; and
    parsing the response message to acquire the multicast source DNS address list of the IPTV server.

2. The method according to claim 1, wherein the step of conducting the address verification on the multicast data message according to the multicast source DNS address list and a locally maintained multicast address list after the multicast data message issued by the IPTV server is received comprises:
    parsing the multicast data message to acquire a source IP address and a destination IP address of the multicast data message after the multicast data message issued by the IPTV server is received;
    matching the source IP address of the multicast data message with the multicast source DNS address list, and matching the destination IP address of the multicast data message with the multicast address list;
    succeeding in verification when both the source IP address and the destination IP address of the multicast data message are matched with corresponding address information; otherwise, failing in verification.

3. The method according to claim 2, wherein the step of conducting forwarding control on the multicast data message according to the verification result comprises:
    forwarding the multicast data message to an IPTV receiving device when the verification succeeds; otherwise, abandoning the multicast data message.

4. The method according to claim 1, prior to the step of conducting address verification on the multicast data message according to the multicast source DNS address list information and the locally maintained multicast address list, further comprising:
    receiving a multicast protocol message transmitted by the IPTV receiving device, and forwarding the multicast protocol message to the IPTV server;
    parsing the multicast protocol message, and judging whether the multicast protocol message is a joining message or a leaving message; and
    adding the corresponding multicast address information into the multicast address list if the multicast protocol message is the joining message; and deleting the corresponding multicast address information from the multicast address list if the multicast protocol message is the leaving message.

5. The method according to claim 4, wherein the multicast source DNS address list information comprises an address updating time issued by the domain name server; and, after the step of acquiring the multicast source DNS address list of the IPTV server, the method further comprises:
    setting a timer according to the address updating time, and regularly transmitting a DNS request message to the domain name server to update the multicast source DNS address list of the IPTV server.

6. A multicast security control device based on DNS, comprising a processor and a storage device, wherein the storage device stores processor-executable programs, and the programs comprise:
    an acquisition module, configured to transmit a DNS request message to a domain name server to acquire a multicast source DNS address list of an IPTV server;
    a verification module, configured to conduct address verification on a multicast data message according to the multicast source DNS address list and a locally maintained multicast address list after the multicast data message issued by the IPTV server is received; and
    a control module, configured to conduct forwarding control on the multicast data message according to a verification result;
    wherein the acquisition module comprises:
    a configuration unit, configured to allocate domain name address information of the IPTV server;

a transmission unit, configured to transmit the DNS request message to the domain name server, wherein the DNS request message includes the domain name address information of the IPTV server;

a receiving unit, configured to receive a response message, fed back by the domain name server, corresponding to the domain name address information of the IPTV server; and an acquisition unit, configured to parse the response message to acquire the multicast source DNS address list of the IPTV server.

7. The device according to claim 6, wherein the verification module comprises:

a parsing unit, configured to parse the multicast data message to acquire a source IP address and a destination IP address of the multicast data message after the multicast data message issued by the IPTV server is received;

a matching unit, configured to match the source IP address of the multicast data message with the multicast source DNS address list, and to match the destination IP address of the multicast data message with the multicast address list; and a judging unit, configured to determine success in verification when both the source IP address and the destination IP address of the multicast data message are matched with the corresponding address information; otherwise to determine failure in verification.

8. The device according to claim 6, wherein the control module is further configured to forward the multicast data message to an IPTV receiving device when the verification succeeds; otherwise, to abandon the multicast data message.

9. The device according to claim 6, wherein the programs further comprise:

a multicast address updating module, configured to receive a multicast protocol message transmitted by the IPTV receiving device and to forward the multicast protocol message to the IPTV server; to parse the multicast protocol message, and to judge whether the multicast protocol message is a joining message or a leaving message; and, to add the corresponding multicast address information into the multicast address list if the multicast protocol message is the joining message; and to delete the corresponding multicast address information from the multicast address list if the multicast protocol message is the leaving message.

10. The device according to claim 9, wherein the acquisition module is further configured to set a timer according to the address updating time, and to regularly transmit the DNS request message to the domain name server to update the multicast source DNS address list of the IPTV server.

11. The method according to claim 2, prior to the step of conducting address verification on the multicast data message according to the multicast source DNS address list information and the locally maintained multicast address list, further comprising:

receiving a multicast protocol message transmitted by the IPTV receiving device, and forwarding the multicast protocol message to the IPTV server;

parsing the multicast protocol message, and judging whether the multicast protocol message is a joining message or a leaving message; and adding the corresponding multicast address information into the multicast address list if the multicast protocol message is the joining message; and deleting the corresponding multicast address information from the multicast address list if the multicast protocol message is the leaving message.

12. The method according to claim 3, prior to the step of conducting address verification on the multicast data message according to the multicast source DNS address list information and the locally maintained multicast address list, further comprising:

receiving a multicast protocol message transmitted by the IPTV receiving device, and forwarding the multicast protocol message to the IPTV server;

parsing the multicast protocol message, and judging whether the multicast protocol message is a joining message or a leaving message; and adding the corresponding multicast address information into the multicast address list if the multicast protocol message is the joining message; and deleting the corresponding multicast address information from the multicast address list if the multicast protocol message is the leaving message.

13. The method according to claim 11, wherein the multicast source DNS address list information comprises an address updating time issued by the domain name server; and, after the step of acquiring the multicast source DNS address list of the IPTV server, the method further comprises:

setting a timer according to the address updating time, and regularly transmitting a DNS request message to the domain name server to update the multicast source DNS address list of the IPTV server.

14. The device according to claim 7, wherein the programs further comprise:

a multicast address updating module, configured to receive a multicast protocol message transmitted by the IPTV receiving device and to forward the multicast protocol message to the IPTV server; to parse the multicast protocol message, and to judge whether the multicast protocol message is a joining message or a leaving message; and, to add the corresponding multicast address information into the multicast address list if the multicast protocol message is the joining message; and to delete the corresponding multicast address information from the multicast address list if the multicast protocol message is the leaving message.

15. The device according to claim 8, wherein the programs further comprise:

a multicast address updating module, configured to receive a multicast protocol message transmitted by the IPTV receiving device and to forward the multicast protocol message to the IPTV server; to parse the multicast protocol message, and to judge whether the multicast protocol message is a joining message or a leaving message; and, to add the corresponding multicast address information into the multicast address list if the multicast protocol message is the joining message; and to delete the corresponding multicast address information from the multicast address list if the multicast protocol message is the leaving message.

16. The device according to claim 14, wherein the acquisition module is further configured to set a timer according to the address updating time, and to regularly transmit the DNS request message to the domain name server to update the multicast source DNS address list of the IPTV server.

* * * * *